US012777079B2

(12) United States Patent
Mohamed Nabeel et al.

(10) Patent No.: US 12,777,079 B2
(45) Date of Patent: Oct. 27, 2026

(54) REAL-TIME AUTOMATED EXTRACTION OF CAMPAIGN CTI FROM THREAT REPORTS

(71) Applicant: Palo Alto Networks, Inc., Santa Clara, CA (US)

(72) Inventors: Mohamed Yoosuf Mohamed Nabeel, San Jose, CA (US); Gaurav Mitesh Dalal, Fremont, CA (US); Shaown Sarker, San Jose, CA (US); Shehroze Farooqi, Santa Clara, CA (US); Janos Szurdi, Budapest (HU)

(73) Assignee: Palo Alto Networks, Inc., Santa Clara, CA (US)

( * ) Notice: Subject to any disclaimer, the term of this patent is extended or adjusted under 35 U.S.C. 154(b) by 86 days.

(21) Appl. No.: 18/959,324

(22) Filed: Nov. 25, 2024

(65) Prior Publication Data

US 2026/0149741 A1 May 28, 2026

(51) Int. Cl.
*H04L 9/40* (2022.01)
*G06F 16/34* (2019.01)
(Continued)

(52) U.S. Cl.
CPC ............ *H04L 63/20* (2013.01); *G06F 16/345* (2019.01); *G06F 16/9024* (2019.01); *G06F 40/30* (2020.01)

(58) Field of Classification Search
CPC ...... G06N 20/00; G06N 20/20; G06F 16/345; G06F 16/358; G06F 16/9024; G06F 40/30; H04L 63/14; H04L 63/1441
See application file for complete search history.

(56) References Cited

U.S. PATENT DOCUMENTS

2019/0166164 A1* 5/2019 Yamada ................ G06F 21/552
2023/0385607 A1* 11/2023 Biswas ................ G06N 3/0464
(Continued)

OTHER PUBLICATIONS

Rastogi et al., "TINKER: A framework for Open source Cyberthreat Intelligence" [Online], Jan. 19, 2023 [Retrieved on: May 26, 2026], www.arxiv.org, Retrieved from: < https://arxiv.org/pdf/2102.05571 > (Year: 2023).*
(Continued)

*Primary Examiner* — Eric W Shepperd
(74) *Attorney, Agent, or Firm* — Gilliam IP PLLC

(57) ABSTRACT

A pipeline has been created that leverages artificial intelligence and machine learning to efficiently extract information from CTI reports obtained from various sources and yielding information that assists security analysts/threat teams (e.g., security operations centers (SoCs)) and improving the quality of CTI. The "CTI analysis pipeline" employs generative artificial intelligence ("genAI") to summarize a collection of CTI threat reports and extract threat-related information including TTPs from the CTI reports. Relationships among the threat reports are determined based on the extracted threat-related information and encoded in a graph structure. Graph embeddings based on the relationships encoded in the graph structure and semantic embeddings from the report summaries are combined and the combined embeddings are clustered. The resulting clusters and trained clustering model can be used in various ways to improve CTI, such as determining malicious campaigns, augmenting existing campaign information, and detecting new IOCs and TTPs for existing campaigns and new campaigns.

20 Claims, 5 Drawing Sheets

(51) Int. Cl.
*G06F 16/901* (2019.01)
*G06F 40/30* (2020.01)

(56) References Cited

U.S. PATENT DOCUMENTS

| | | | | |
|---|---|---|---|---|
| 2024/0031383 | A1 | 1/2024 | Szurdi et al. | |
| 2024/0223587 | A1* | 7/2024 | Berger | G06N 20/00 |
| 2024/0411994 | A1* | 12/2024 | Siracusano | G06F 40/205 |
| 2025/0045411 | A1* | 2/2025 | Singh | G06F 21/552 |
| 2025/0291933 | A1* | 9/2025 | Bu | H04L 63/1433 |
| 2025/0328634 | A1* | 10/2025 | Mardikar | G06F 21/55 |
| 2025/0328653 | A1* | 10/2025 | Chen | G06F 21/577 |

OTHER PUBLICATIONS

Bratas et al., "Knowledge Graphs and Semantic Web Tools in Cyber Threat Intelligence: A Systematic Literature Review" [Online], Aug. 1, 2024 [Retrieved on: May 26, 2026], J. Cybersecur. Priv. 2024, Retrieved from: < https://www.mdpi.com/2624-800X/4/3/25/pdf?version=1722523388 > (Year: 2024).*

Liao, et al., "Acing the IOC Game: Toward Automatic Discovery and Analysis of Open-Source Cyber Threat Intelligence", CCS '16: Proceedings of the 2016 ACM SIGSAC Conference on Computer and Communications Security <https://doi.org/10.1145/2976749.297831>, Oct. 24, 2016, 12 pages.

Rahman, et al., "ALERT: A Framework for Effcient Extraction of Attack Techniques from Cyber Threat Intelligence Reports Using Active Learning", 38th International IFIP Conference on Data and Application Security and Privacy (DBSEC 2024) <https://doi.org/10.1007/978-3-031-65172-4_13>, Jul. 13, 2024, 18 pages.

* cited by examiner

REAL-TIME AUTOMATED EXTRACTION OF CAMPAIGN CTI FROM THREAT REPORTS

BACKGROUND

The disclosure generally relates to machine learning models and artificial intelligence for data analysis (e.g., CPC subclasses G06N 20/20 and G06F).

Cyberthreat intelligence (CTI) refers to information gathered and analyzed by an organization(s) about potential and ongoing threats to cybersecurity and infrastructure. CTI provides tactical information that organizations can use to identify and respond to cyberattacks. CTI can be categorized into strategic intelligence, tactical intelligence, and operational intelligence. CTI reports will often be published to share information across organizations through advisories, CTI feeds, blogs, open-source intelligence sources, and/or closed-source services.

A CTI report, as defined by the National Institute of Standards and Technology (NIST) Computer Security Resource Center (CSRC), is a prose document that describes TTPs (tactics, techniques, and procedures), actors, types of systems and information being targeted, and other threat-related information including indicators of compromise (IoC). NIST CSRC defines TTP as the behavior of an actor, also referred to as a malicious actor or threat actor. The NIST CSRC glossary states "A tactic is the highest-level description of this behavior, while techniques give a more detailed description of behavior in the context of a tactic, and procedures an even lower-level, highly detailed description in the context of a technique." The MITRE corporation publishes knowledge bases of adversary tactics and techniques for industrial control systems, for enterprise platforms, and for mobile platforms in the ATT&CK® matrix. CISA (Cybersecurity & Infrastructure Security Agency of the U.S. Department of Homeland Security) defines IoCs as digital and informational "clues" that incident responders use to detect, diagnose, halt, and remediate malicious activity in their networks. These digital and informational clues are forensic evidence of breach, compromise, attack, or intrusion. An IoC can be a domain, uniform resource locator (URL), Internet Protocol (IP) address(es), a filename, file signature (e.g., hash value), common vulnerability enumerator (CVE), and a registry key.

Rapid developments in artificial intelligence (AI) technologies have spawned numerous terms with fluid meanings. Recently, AI technologies are frequently referred to with the terms large language model (LLM), generative AI, and foundation model. Many of these technologies are based on or relate to the "Transformer" architecture.

A "Transformer" was introduced in VASWANI, et al. "Attention is all you need" presented in Proceedings of the 31st International Conference on Neural Information Processing Systems on December 2017, pages 6000-6010. The Transformer is a first sequence transduction model that relies on attention and eschews recurrent and convolutional layers. The Transformer architecture has been referred to as a "foundational model." The Center for Research on Foundation Models at the Stanford Institute for Human-Centered Artificial Intelligence used this term in an article "On the Opportunities and Risks of Foundation Models" to describe a model trained on broad data at scale that is adaptable to a wide range of downstream tasks. There has been subsequent research in similar Transformer-based sequence modeling. The architecture of a Transformer model typically is a neural network with transformer blocks/layers, which include self-attention layers, feed-forward layers, and normalization layers. The Transformer model learns context and meaning by tracking relationships in sequential data.

BRIEF DESCRIPTION OF THE DRAWINGS

Embodiments of the disclosure may be better understood by referencing the accompanying drawings.

DESCRIPTION

The description that follows includes example systems, methods, techniques, and program flows to aid in understanding the disclosure and not to limit claim scope. Well-known instruction instances, protocols, structures, and techniques have not been shown in detail for conciseness.

Terminology

The term "pipeline" is used herein to refer to multiple software components logically arranged in series for output of a software component to be input for a next software component. The pipeline likely includes program code to logically connect the software components to allow flow of inputs and outputs without manual intervention.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

Overview

Although many sources of CTI reports are available, the volume of CTI reports greatly outpaces the cybersecurity analysts available to analyze the reports and inform incident response plans. Furthermore, the many sources of CTI reports do not adhere to canonical naming of threat actors or campaigns, which increases the challenge of correlating information.

A pipeline has been created that leverages artificial intelligence and machine learning to efficiently extract information from CTI reports obtained from various sources and yielding information that assists security analysts/threat teams (e.g., security operations centers (SoCs)) and improving the quality of CTI. The "CTI analysis pipeline" employs generative artificial intelligence ("genAI") to summarize a collection of CTI threat reports and extract threat-related information including TTPs and IoCs from the CTI reports. Relationships among the threat reports are determined based on the extracted threat-related information (e.g., TTPs, IoCs, threat actors) and encoded in a graph structure. Graph embeddings based on the relationships encoded in the graph structure and semantic embeddings from the report summaries are combined and the combined embeddings are clustered. The resulting clusters and trained clustering model can be used in various ways to improve CTI, such as determining malicious campaigns, augmenting existing campaign information, and detecting new campaigns.

Example Illustrations

Figure 1:
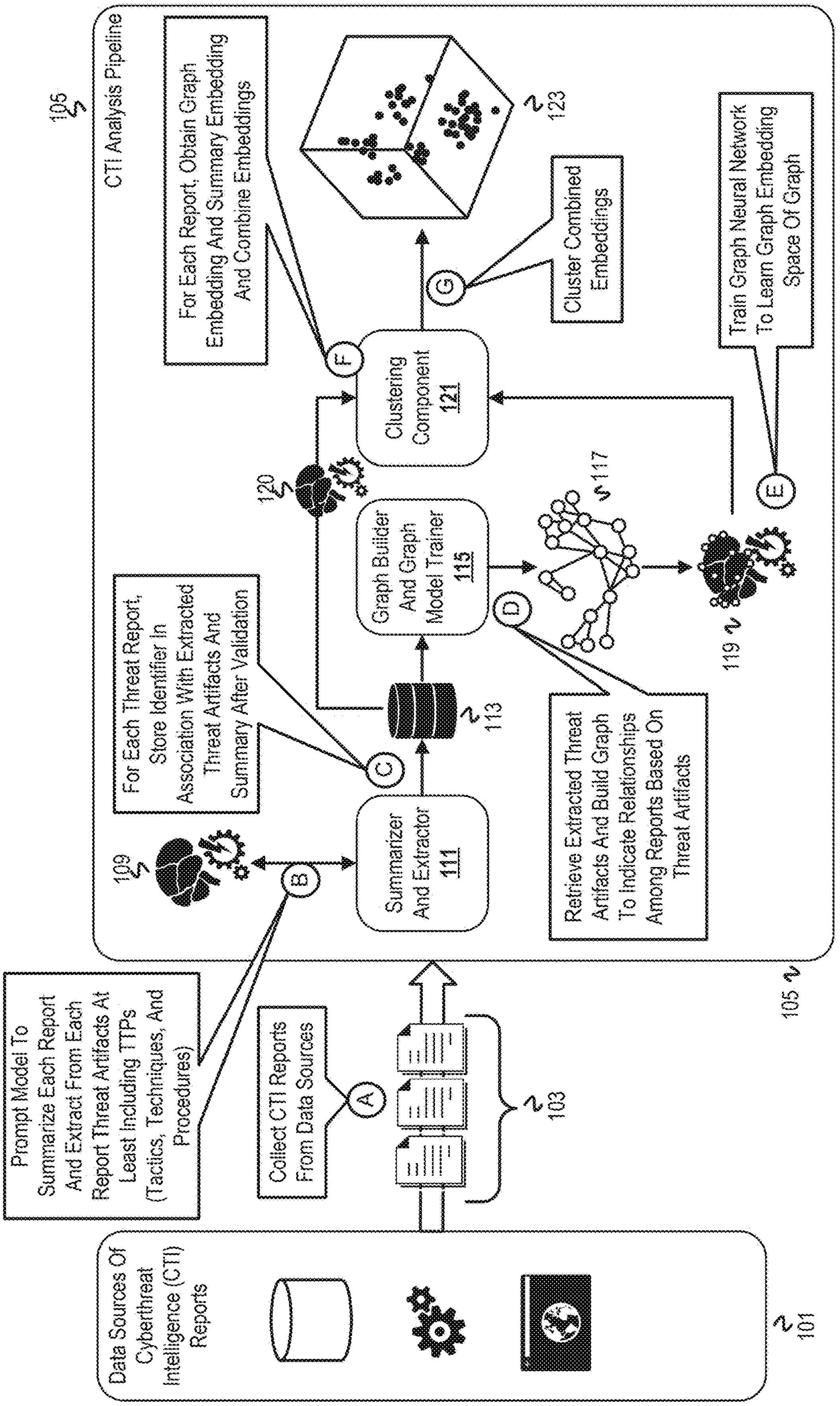
FIG. 1 is a diagram of a CTI analysis pipeline being trained with a collection of CTI reports.

FIG. 1 is a diagram of a CTI analysis pipeline being trained with a collection of CTI reports. A CTI analysis pipeline 105 includes a summarizer and extractor 111, a data store 113, a graph builder and graph model trainer 115, a graph model 119, a semantic embedding model 120, and a clustering component 121. The CTI analysis pipeline 105 is communicatively coupled with sources 101 of CTI reports. FIG. 1 depicts the CTI analysis pipeline 105 as including a generative AI model 109, but may interact with a generative AI model service instead.

FIG. 1 is annotated with a series of letters A-F, each of which represents a stage of one or more operations. Although these stages are ordered for this example, the stages illustrate one example to aid in understanding this disclosure and should not be used to limit the claims. Subject matter falling within the scope of the claims can vary from what is illustrated.

At stage A, the CTI analysis pipeline 105 collects CTI reports 103 from data sources 101. The CTI analysis pipeline 105 may subscribe to data feeds, periodically access an external repository, periodically access an internal repository, and process websites including images. Initially, CTI reports may be accumulated into an accessible repository and used to initialize the CTI analysis pipeline 105. After initialization/training, the CTI analysis pipeline 105 monitors the data sources 101 for newly available CTI reports.

At stage B, the summarizer and extractor 111 generates summaries of the CTI reports 103 and extracts threat artifacts from the CTI reports 103. To generate the summaries, the summarizer and extractor 111 prompts the genAI model to summarize each report. In the same prompt or a different prompt, the summarizer and extractor 111 prompts the genAI model 109 to extract threat artifacts from each of the CTI reports 103. Extracted threat artifacts are validated based on various techniques including checking named entities against known threat information, and ascertaining the syntactic validity of artifacts. Examples of the threat artifacts include threat actors, IoCs, TTPs, and campaign names. Below is an example of a prompt that can be used to extract threat artifacts and other relevant information from a given CTI report. The example prompt specifies an output format suitable for storing the output and analyzing the output.

"From text at the end of the following prompt, provide a short threat intelligence summary, threat actors, malicious campaigns, iocs and their type. The output should be in JSON format with the following keys:
summary, iocs, threat_actors, campaigns, comment.
If no relevant content for each key is not available in the given text, do not print the corresponding key in output. The ioc key value in output should be a key value pair where the key is the ioc itself, and the value is the type of the ioc from one of the following: url, domain, ip, hash, path, registry_key, filename. Text to work with:
CTI REPORT TEXT

At stage C, the summarizer and extractor 111 stores the results of the extracting and summarizing into a data store 113. Prior to storing, the summarizer and extractor 111 validates the extraction results. For instance, the summarizer and extractor 111 grounds/validates the model extracted IoCs against the signature-based IoCs and validates extracted threat artifacts against information in the MITRE ATT&CK® Matrix. This validation may eliminate some of the artifacts extracted by the model. The summarizer and extractor 111 updates the data store 113 with a data entry for each CTI report. While the data entry may not expressly include the CTI report, the data entry includes an identifier and metadata at least indicating the corresponding one of the data sources 101. The data entry will also indicate the extracted threat artifacts and report summary. The operations of stages B and C likely overlap as results are stored into the data store 113.

At stage D, the graph builder and graph model trainer 115 builds a graph 117 that expresses or encodes the relationships among CTI reports based on the extracted artifacts. The graph builder and graph model trainer 115 retrieves extracted threat artifacts from each data entry in the data store 113 and iteratively builds the graph 117. The graph builder and graph model trainer 115 adds a node that represents the CTI report. The graph builder and graph model trainer 115 then adds nodes representing the threat artifacts and relates the nodes representing the CTI report and the threat artifacts of the CTI report. Before updating the graph 117, the graph builder and graph model trainer 115 searches the graph 117 to determine whether a threat artifact is already represented by a node. Thus, various threat artifacts from different CTI reports will become related.

At stage E, the graph builder and graph model trainer 115 trains the graph model 119 to learn a graph embedding space of the graph 117. The graph builder and graph model trainer 115 trains the graph model 119 to learn the graph embedding space based on structural relationships expressed in the graph 117 and feature vectors. A feature vector for a threat report will be a feature vector of the threat artifacts extracted from the CTI report.

At stage F, the clustering component 121 obtains semantic embeddings and graph embeddings of the CTI reports and combines the embeddings. The clustering component 121 retrieves the CTI report summaries and generates embeddings from the CTI report summaries with the embedding model 120. For each CTI report, the clustering component 121 obtains a graph embedding from the graph model 119 and correlates with a CTI report summary embedding by CTI report identifier and combines the embeddings. Thus, each CTI report will be represented by a summary embedding combined with a graph embedding.

At stage G, the clustering component 121 clusters the combined embeddings. The clustering component 121 implements a clustering algorithm to train a clustering model 123 and yield clusters of the combined embeddings. Examples of clustering algorithms that can be used include agglomerative clustering, k means clustering, density-based spatial clustering of applications with noise (DBSCAN), and hierarchical DBSCAN (HDBSCAN). Each clustering is an indication or suggestion that the corresponding CTI reports describe or correspond to a same attack or attack campaign. The aggregate intelligence of a cluster provides improved intelligence of an attack/campaign than any of the standalone CTI reports. The initial clusters can reveal campaigns and provide more comprehensive intelligence on attacks and campaigns. With the established/trained pipeline, intelligence incrementally improves for identified attacks/campaigns with newly detected CTI reports and new attacks/campaigns can be discovered.

Figure 2:
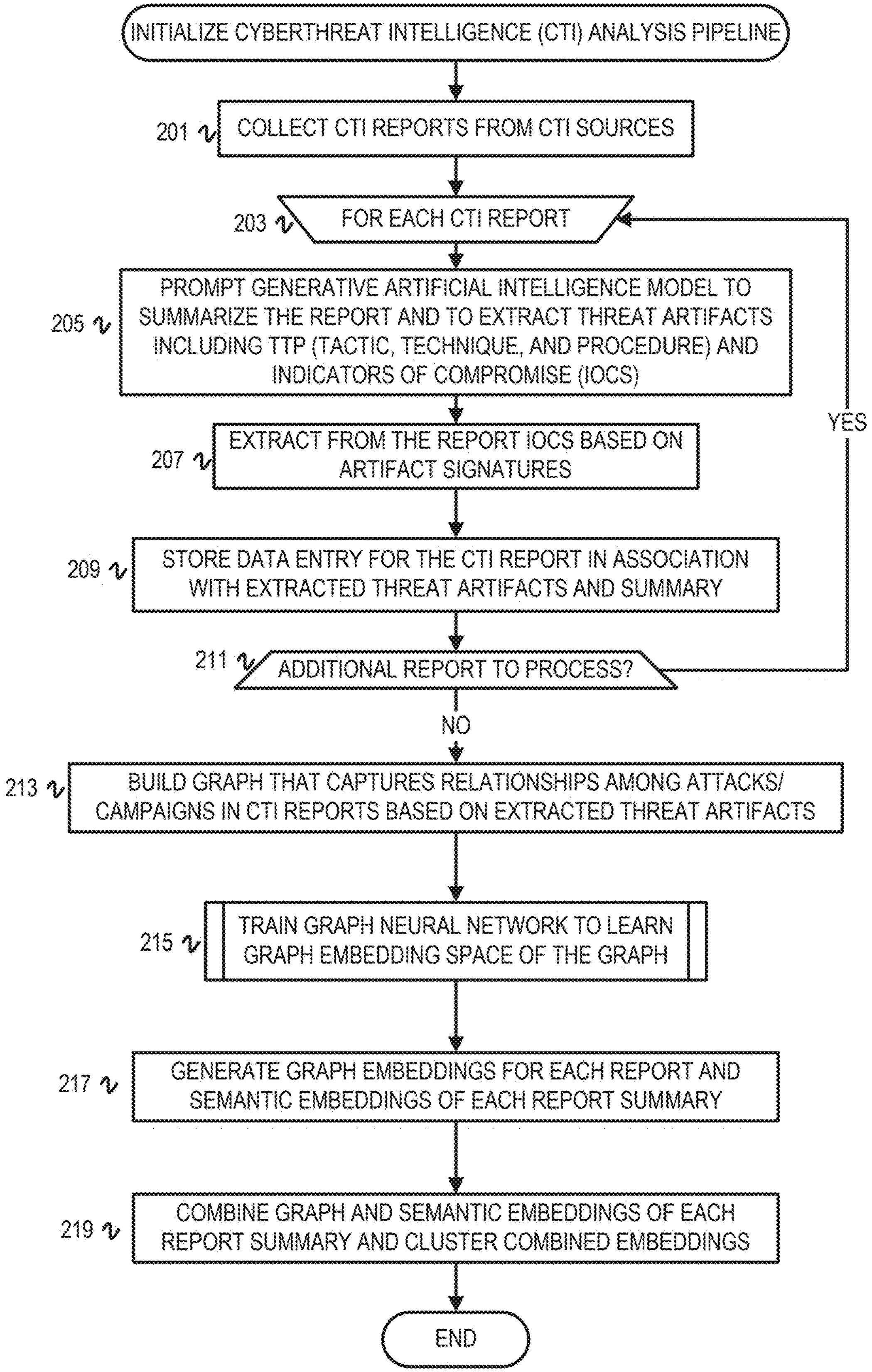
FIG. 2 is a flowchart of example operations for initializing a CTI analysis pipeline.
Figure 3:
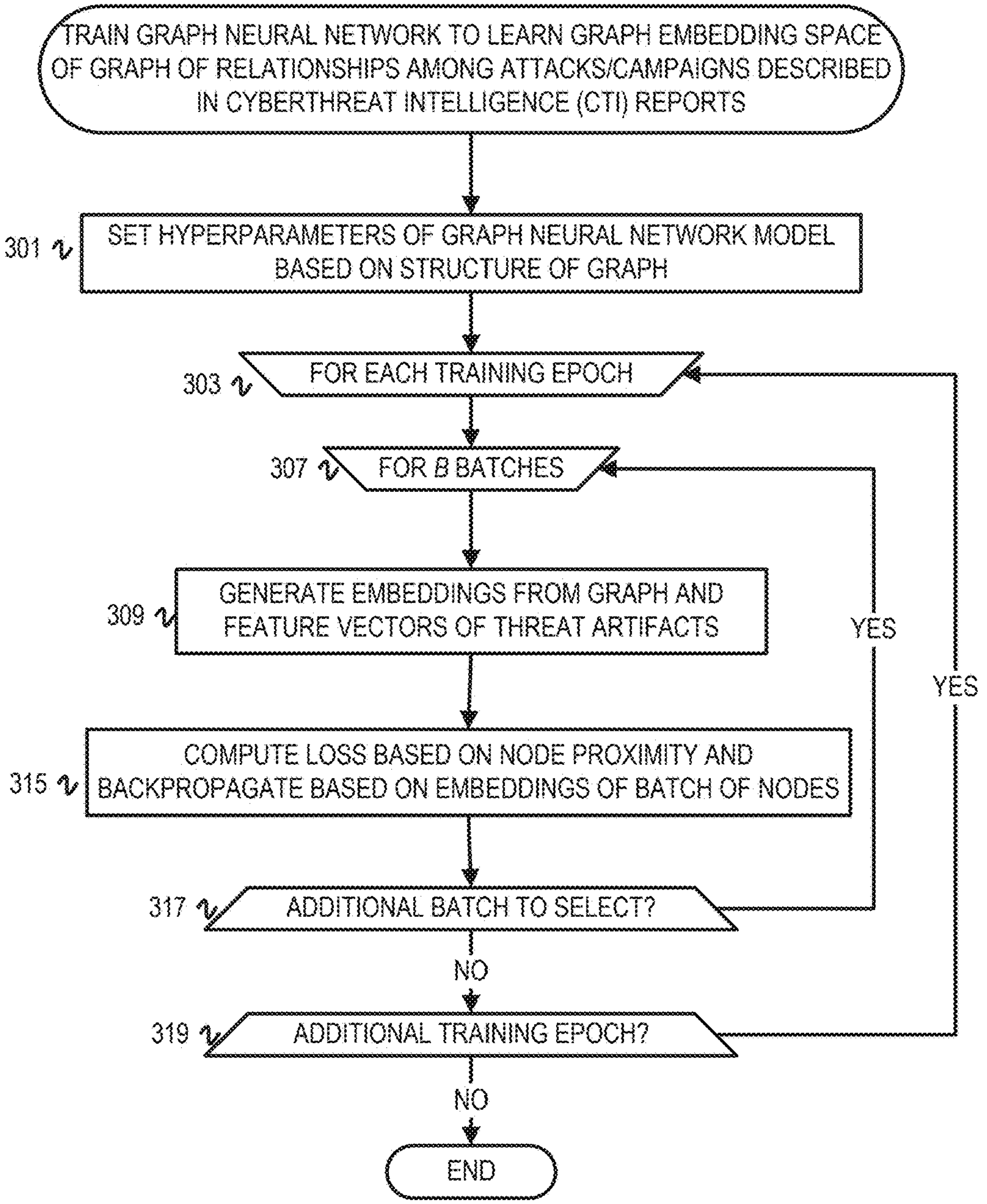
FIG. 3 is a flowchart of example operations for training a GNN to learn a graph embedding space of a graph of relationships among CTI reports and threat artifacts of the CTI reports.
Figure 4:
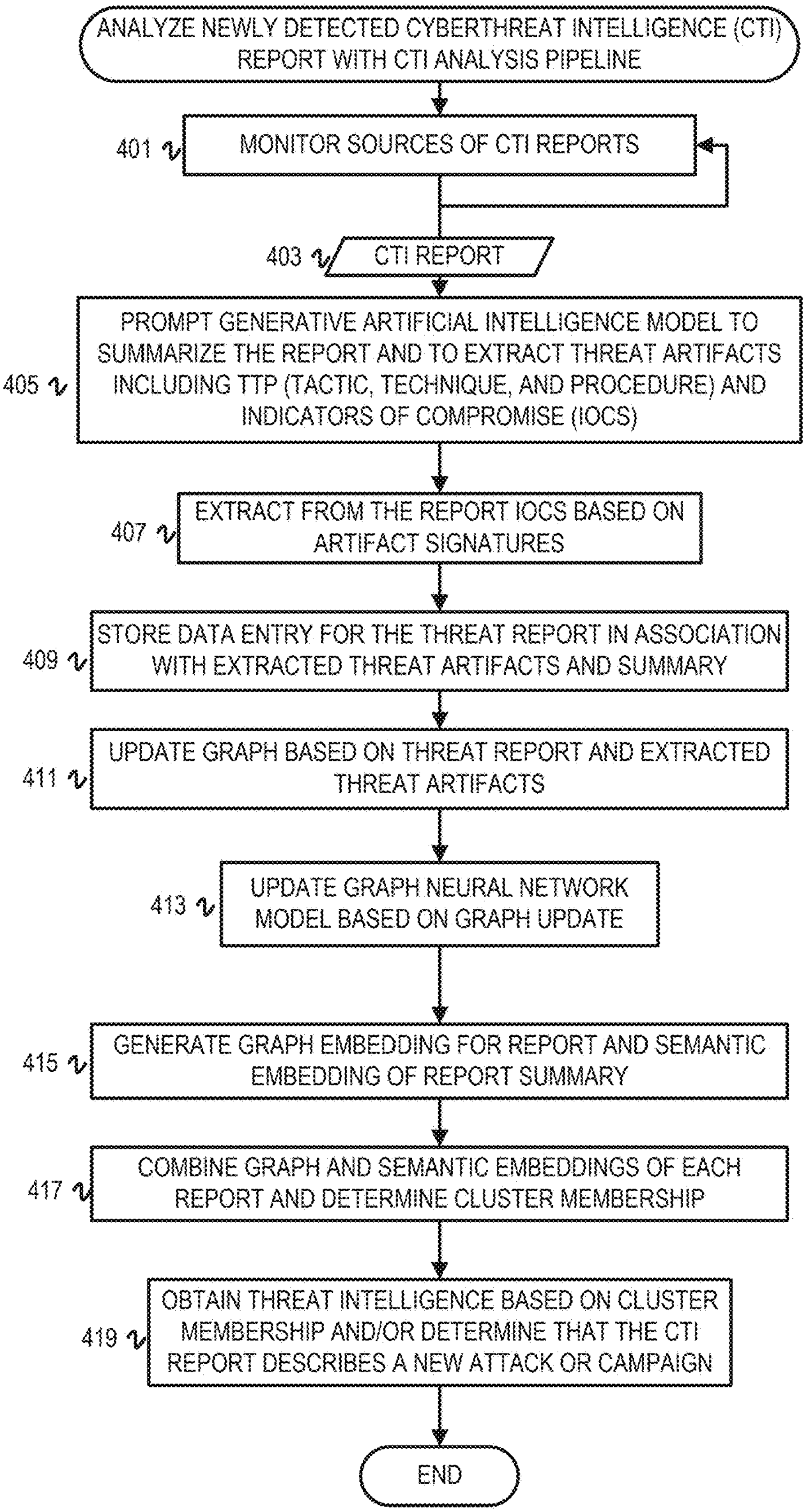
FIG. 4 is a flowchart of example operations for analyzing newly detected CTI reports with the CTI analysis pipeline.

FIGS. 2-4 are flowcharts of example operations for establishing a CTI analysis pipeline and capturing new intelligence with CTI reports from monitored report sources. The example operations are described with reference to a pipeline for consistency with FIG. 1 and/or ease of understanding. The name chosen for the program code is not to be limiting on the claims. Structure and organization of a program can vary due to platform, programmer/architect preferences, programming language, etc. In addition, names of code units (programs, modules, methods, functions, etc.) can vary for the same reasons and can be arbitrary.

FIG. 2 is a flowchart of example operations for initializing a CTI analysis pipeline. Initializing the pipeline involves training a graph neural network (GNN) to obtain a trained GNN model and training a clustering model.

At block 201, the pipeline collects CTI reports from sources of CTI reports. Collecting the CTI reports will vary depending upon the form of the CTI reports. For instance, a CTI report may be presented in a blog post that includes different sections of structured and unstructured data, as well as images or even video. As an example, a CTI report may have program code, screenshots of web pages, screenshots of command lines, diagrams, and prose. Thus, collecting the CTI report could involve scraping web page sources. Collecting may be retrieving from a database or file system, or querying according to an application programming interface (API).

At block 203, the pipeline begins iteratively processing each CTI report. The iterative processing includes extraction and summarization operations. Assuming the CTI reports have been organized into a structure, the pipeline retrieves each CTI report from the structure. Implementations can employ parallel processing to process the CTI reports assuming the generative AI model has capacity to respond to concurrent requests.

At block 205, the pipeline prompts a generative AI model to summarize the report and to extract threat artifacts including TTPs and IoCs. The pipeline can prompt the same or different generative AI models to summarize the CTI report and to extract threat artifacts. While some threat artifacts can be extracted with a pattern matching or regular expression matching (e.g., extracting a CVE or some IoCs), TTPs are challenging since they are often expressed with unstructured text/natural language and are not necessarily expressly identified. Below is an example prompt that could be generated, assuming an implementation that uses a single prompt.

A cyberthreat intelligence report is after the marker  or available at the URL identified after . Summarize the report and output the summary according to the format indicated below with the label SUMMARY FORMAT. Extract from the report, not from the summary, any threat artifacts in the report. The threat artifacts should be all of the indicators of compromise in the report, TTPs (tactics, techniques, and procedures) in the report, threat actors identified in the report, and campaign names in the report. Refer to the MITRE ATT&CK Matrix for Enterprise for identifying and extracting TTPs, derive techniques from details given in THREAT REPORT** section.

For each technique try to provide techniqueID, Name of Tactic, Comments as reference text from actual content. Structure JSON with columns: technique, technique ID, tactic, comment, confidence of association to technique ID (Hi, Medium, Low). If you find TTP ID mentioned directly in the THREAT REPORT section, just use those. In case you don't find any TTPs related from the THREAT REPORT section, just return NOT FOUND. Output the threat artifacts according to the format identified with the label EXTRACTED ARTIFACTS FORMAT.

SUMMARY FORMAT

//Specific format desired

EXTRACTED ARTIFACTS FORMAT

//Specific format desired

The specified format is suitable for storing the response from the generative AI model for retrieval by subsequent components in the pipeline.

At block 207, the pipeline extracts from the report IoCs based on artifact signatures. The pipeline can also include program code that searches for signatures (i.e., patterns or regular expressions) of more structured artifacts, such as network addresses and CVEs. In addition to typical validity checks on model responses, the threat artifacts extracted based on signature matching can be used to validate some of the threat artifacts extracted by the generative AI model.

At block 209, the pipeline stores a data entry for the CTI report in association with the extracted threat artifacts and the summary. The pipeline updates a data store accessible by the pipeline or within the pipeline with an entry for the report. The data entry will include an identifier of the CTI report, the CTI report or a reference to the CTI report, the summary of the CTI report, and the extracted threat artifacts. The identifier of the CTI report can encode a data source identifier or a combination of fields in the data entry can be used to identify a report. For example, a data entry can include fields for a CTI report name, a data source identifier, and a time stamp, which collectively identify the CTI report.

At block 211, the pipeline determines whether there is an additional CTI report to process. If so, operational flow returns to block 203. Otherwise, operational flow proceeds to block 213.

At block 213, the pipeline builds a graph that captures relationships among CTI reports based on extracted threat artifacts. While referred to as capturing relationships of CTI reports, this can also be described as capturing relationships among attacks or campaigns described in the CTI reports. Various libraries and techniques are available for building a graph to capture these relationships. One example will be provided. For each CTI report, the pipeline adds a node that represents the CTI report. While it may not be necessary to preserve a name or identifier of the CTI report assigned by the data source, the node is encoded with data that distinguishes the CTI report from other CTI reports. A node annotation can include a data source identifier of the CTI report. The pipeline iterates through the threat artifacts extracted from the report and determines whether the graph already represents the threat artifact. If the threat artifact is already represented in the graph, then an edge is added to relate the threat artifact node to the CTI report node. If the threat artifact is not represented in the graph, then a node representing the threat artifact is added to the graph, as well as an edge to relate the threat artifact node to the CTI report node. A threat artifact node is encoded with the data of the threat artifact (e.g., a network address or TTP). For example, a TTP node can be encoded with an array or tuple that indicates the tactic name (e.g., "Initial Access"), technique identifier (e.g., T1566.002), and a procedure identifier (e.g., S0677). Embodiments may convert the graph into a homogenous graph, for a tradeoff between resource consumption and embedding quality, by collapsing non-CTI report nodes into edges.

At block 215, the pipeline trains a graph neural network to learn graph embedding space of the graph that has been built. The condensed graph of related CTI reports is used to train a GNN model. FIG. 3 provides example operations to elaborate.

At block 217, the pipeline generates graph embeddings for each report and semantic embeddings of each report summary. For each CTI report in the data store, the pipeline will generate an embedding from the summary and generate a graph embedding from the GNN. The pipeline can use the same generative AI model that summarized and/or extracted threat artifacts or use a different embedding model. With the trained GNN, the pipeline can input a feature vector of the CTI report that includes the extracted threat actors and obtain a graph embedding from the trained GNN. The embeddings are then associated with the corresponding CTI report data entry.

At block 219, the pipeline combines graph and semantic embeddings of each report summary. The pipeline retrieves the embeddings of each report and aggregates the embeddings, for example, concatenates the semantic embedding to the graph embedding. With the aggregate/combined embeddings, the pipeline executes a clustering algorithm to train a clustering model and obtain clusters of the combined embeddings. Each of the clusters indicates an attack or campaign described with threat artifacts across multiple CTI reports, thus revealing patterns of relationship and overcoming the variations in naming, structure, etc. The aggregate of threat artifacts can be indicated for the attack/campaign. The collection of CTI reports represented in a cluster can be synthesized into a single report for security analysis. The varying names can be coalesced and mapped to a canonical attack/campaign identifier. For instance, the pipeline can iterate through the clusters or select a cluster and, for each cluster, retrieve the threat report summaries and threat artifacts to populate a prompt. The pipeline can prompt a model (e.g., generative AI model or large language model (LLM)) to synthesize the provided information into a single threat intelligence report with citations to the source reports.

FIG. 3 is a flowchart of example operations for training a GNN to learn a graph embedding space of a graph of relationships among CTI reports and threat artifacts of the CTI reports. The example operations are described with reference to the pipeline as mentioned earlier, but are likely invocations defined in a GNN library. Example GNNs that could be used include GraphSAGE, GCN (Graph Convolutional Network), and HGT (Heterogeneous Graph Transformer). The specific implementation for training can vary, for example choosing batch training, depending upon various factors, such as available compute resources.

At block 301, the pipeline sets hyperparameters of a graph neural network based on the structure of the graph of CTI reports. Examples of the hyperparameters to set include the internal embedding size which is dependent on the size of the feature vectors and graph, the number of epochs, the number of internal layers (e.g., 2-4), the activation function (e.g., the rectifier linear unit (ReLU), the exponential linear unit (ELU), etc.), the dropout probability, and an optimization algorithm (e.g., adaptive gradient algorithm, ADADELTA, etc.). Example loss functions that could be used include contrastive loss, embeddings loss, triplet loss, and logistic loss.

At block 303, the pipeline begins one of the training epochs and repeats until the number of training epochs has been satisfied.

At block 307, the pipeline begins a training iteration and repeats for each of B batches of graph embeddings. The GNN implementation used by the pipeline (i.e., a GNN library) will select a batch according to the selected GNN algorithm. For instance, a GNN implementation may select connected components in the graph until the batch size is satisfied and iterate through batches until all connected components of the graph are considered in training.

At block 309, the pipeline invokes the GNN to generate graph embeddings. The pipeline generates an adjacency matrix and feature matrix for each CTI report node as input. In terms more specific to a GNN, the pipeline (or trainer invoked by the pipeline) runs the forward pass of the GNN which involves aggregating messages of neighboring CTI report nodes (e.g., aggregating embeddings of CTI neighbors of a current CTI report node) and concatenates the aggregated embeddings with the embedding of the current node and calculates a dot product with a weight matrix.

At block 315, the pipeline computes loss based on the batch of embeddings and samples. The pipeline runs a sampler which iterates over the batch of graph embeddings and selects, for each graph embedding, neighboring CTI report nodes. The pipeline then runs backpropagation based on the loss computed between the neighboring CTI report nodes. While these example operations refer to backpropagation, embodiments can use another type of GNN that uses forward-forward learning, such as a GNN implemented according to the Graph Forward-Forward (GFF) algorithm or ForwardGNN algorithm.

At block 317, the pipeline determines whether there is another batch of graph embeddings to select. If there is another batch to select (i.e., if B batches have not been selected), then operational flow returns to block 307. Otherwise, operational flow proceeds to block 319.

At block 319, the pipeline determines whether the training epochs have completed. If the training epochs have completed, then operational flow ends for FIG. 3. Otherwise, operational flow returns to block 303.

FIG. 4 is a flowchart of example operations for analyzing newly detected CTI reports with the CTI analysis pipeline. After training/initialization of the CTI analysis pipeline, the pipeline is deployed to monitor for new CTI reports. While the pipeline is trained, some of the example operations will be similar to those in FIG. 2, such as the summarizing and extracting. Those similar operations will be repeated for completeness but with briefer descriptions.

At block 401, the pipeline monitors sources of CTI reports. The pipeline, or one or more other processes/services in communication with the pipeline, monitors the data sources for new CTI reports. The architecture for monitoring can vary. For example, different processes/services may monitor the data sources and write to a database that is monitored by the pipeline. Alternatively, a process/service can monitor one or more data sources and then feed a newly detected CTI report into the pipeline. The monitoring continues until interrupted, for example by manual command. Data sources can be added or removed as well as monitoring services/processes. When a CTI report 403 is detected, operational flow proceeds to block 405.

The pipeline generates a summary of the detected report and extracts threat artifacts from the detected report similar to what is described in FIG. 2. At block 405, the pipeline prompts a generative AI model to summarize the report and to extract threat artifacts including TTPs and IoCs. At block 407, the pipeline extracts from the report IoCs based on artifact signatures. At block 409, the pipeline stores a data entry for the CTI report in association with the extracted threat artifacts and the summary. Validation can include verifying information against established data sources (e.g., threat actor databases) or syntax validation. Embodiments can perform operations to validate the threat artifacts extracted by the generative AI model. Validation can vary by implementation. As examples, validation can include on or more of prompting the generative AI model to validate the responses, prompting the generative AI model with the same prompt and comparing the responses, evaluating the response against heuristics-based rules that establish expected patterns or formatting of threat artifacts, and comparing the threat artifacts extracted by the generative AI model against those extracted based on signatures.

At block 411, the pipeline updates the graph based on the detected CTI report and extracted threat artifacts. The pipeline retrieves the graph and updates the graph to indicate the threat report and its extracted threat artifacts. If a homogenous graph is being used, then the pipeline transforms the graph by folding or collapsing the non-CTI report nodes into edges/relationships to obtain a homogenous version of the updated graph.

At block 413, the pipeline updates the GNN model based on the graph update. The pipeline then retrains the complete graph.

After updating the GNN model based on the graph update to incorporate the detected CTI report, the pipeline obtains and combines embeddings for the detected report. At block 415, the pipeline generates a graph embedding for the detected CTI report and a semantic embedding of the report summary. At block 417, the pipeline combines the graph and semantic embeddings of the detected report.

At block 419, the pipeline obtains threat intelligence based on cluster membership or determines that the CTI report represented by the embedding corresponds to a new attack/campaign. The pipeline determines a cluster membership for the combined embedding of the detected CTI report. If the detected CTI report is a member of an existing cluster, then the intelligence/analysis in the CTI report can be aggregated with the other CTI reports of the attack/campaign represented by the cluster. For instance, new IoCs can be added to information about the attack/campaign. If the embedding combination of the detected CTI report is an outlier or out-of-distribution, then the CTI report can be prioritized as possibly corresponding to a new attack/campaign. In addition, the clustering model can be retrained to include the detected CTI report.

Variations

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. For example, the operation depicted in blocks 205, 405 may be separated into different blocks to represent different prompts being submitted to the same or different generative AI models. It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine readable medium may be a machine readable signal medium or a machine readable storage medium. A machine readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine readable storage medium may be any tangible medium that can contain or store a program for use by or in connection with an instruction execution system, apparatus, or device. A machine readable storage medium is not a machine readable signal medium.

A machine readable signal medium may include a propagated data signal with machine readable program code embodied therein, for example, in baseband or as part of a carrier wave. Such a propagated signal may take any of a variety of forms, including, but not limited to, electro-magnetic, optical, or any suitable combination thereof. A machine readable signal medium may be any machine readable medium that is not a machine readable storage medium and that can communicate, propagate, or transport a program for use by or in connection with an instruction execution system, apparatus, or device.

Program code embodied on a machine readable medium may be transmitted using any appropriate medium, including but not limited to wireless, wireline, optical fiber cable, RF, etc., or any suitable combination of the foregoing.

The program code/instructions may also be stored in a machine readable medium that can direct a machine to function in a particular manner, such that the instructions stored in the machine readable medium produce an article of manufacture including instructions which implement the function/act specified in the flowchart and/or block diagram block or blocks.

Figure 5:
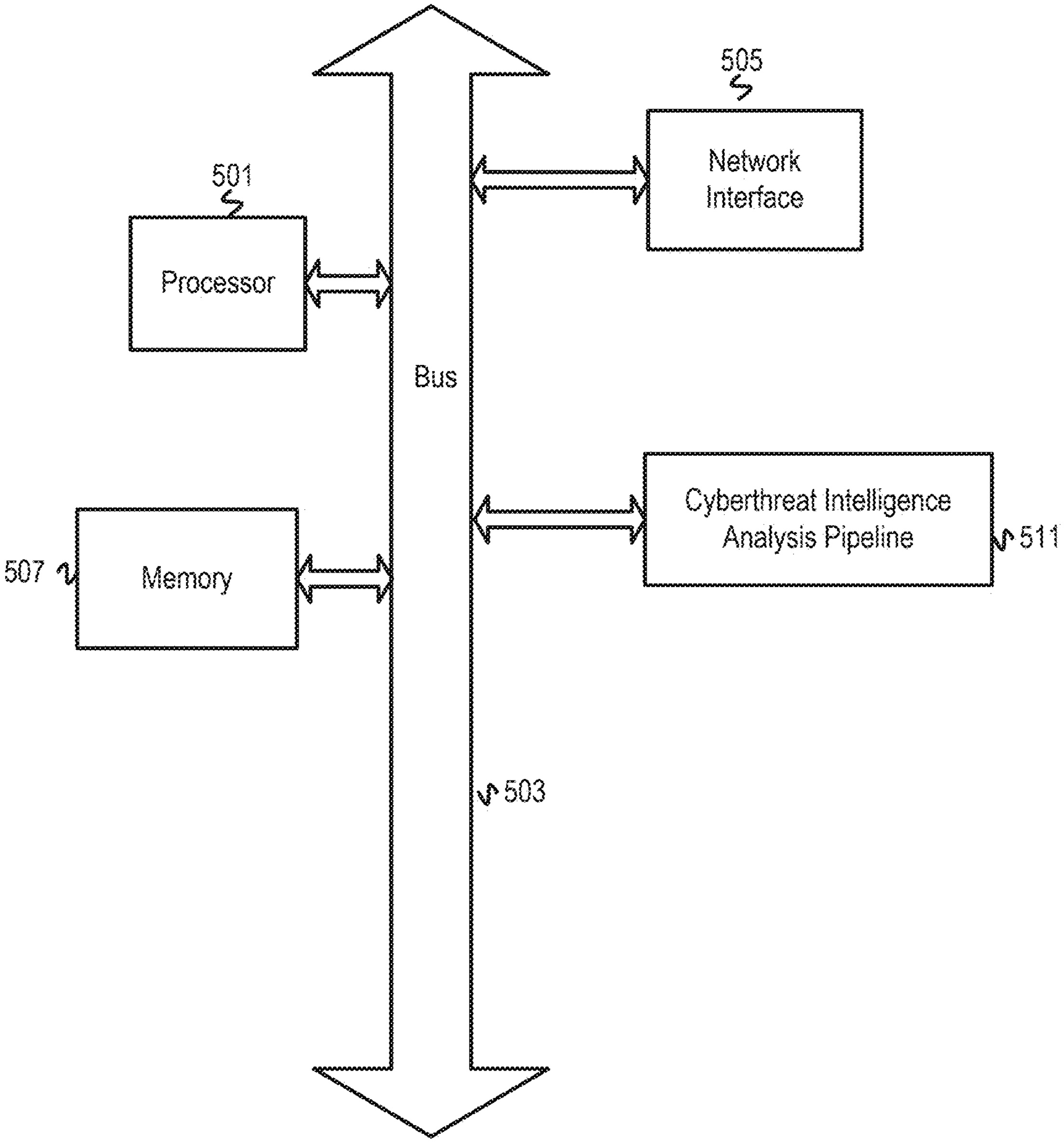
FIG. 5 depicts an example computer system with a CTI analysis pipeline.

FIG. 5 depicts an example computer system with a CTI analysis pipeline. The computer system includes a processor 501 (possibly including multiple processors, multiple cores, multiple nodes, and/or implementing multi-threading, etc.). The computer system includes memory 507. The memory 507 may be system memory or any one or more of the above already described possible realizations of machine-readable media. The computer system also includes a bus 503 and a network interface 505. The system also includes a CTI analysis pipeline 511. The CTI analysis pipeline 511 is trained to learn structural relationships among the descriptions of attacks/campaigns described in CTI reports. The CTI analysis pipeline 511 is also trained to learn an embedding space of summaries of the CTI reports and graph embedding space corresponding to the learning structural relationships. With the graph embeddings and semantic embeddings (e.g., word, phrase or document embeddings), the CTI analysis pipeline 511 combines the embeddings of each CTI report and clusters the combined embeddings. CTI reports represented in a cluster can be aggregated to obtain comprehensive intelligence for an attack/campaign and normalize or map the variations in naming of threat artifacts. The enriched or augmented intelligence can be provided to assist security analysis with a more comprehensive description of an attack/campaign or feed other services or security components to identify infrastructure that supports an attack/campaign. Any one of the previously described functionalities may be partially (or entirely) implemented in hardware and/or on the processor 501. For example, the functionality may be implemented with an application specific integrated circuit, in logic implemented in the processor 501, in a co-processor on a peripheral device or card, etc. Further, realizations may include fewer or additional components not illustrated in FIG. 5 (e.g., video cards, audio cards, additional network interfaces, peripheral devices, etc.). The processor 501 and the network interface 505 are coupled to the bus 503. Although illustrated as being coupled to the bus 503, the memory 507 may be coupled to the processor 501.

The invention claimed is:

1. A method comprising:

for each of a plurality of threat reports collected from multiple data sources, prompting a first language model to summarize the threat report;

prompting the first language model to extract various types of cyberthreat intelligence from the threat report;

storing a data entry that associates the threat report, the threat report summary, and the extracted cyberthreat intelligence;

building a graph based on the plurality of threat reports, instances of the various types of cyberthreat intelligence extracted from the plurality of threat reports, and relationships among the threat reports and the instances of the various types of extracted cyberthreat intelligence;

for each threat report, obtaining a semantic embedding of the summary of the threat report and a graph embedding based on the graph and combining the semantic embedding and the graph embedding of the threat report;

clustering the combined embeddings; and updating information about cyberthreat campaigns based on the clustering of combined embeddings.

2. The method of claim 1 further comprising extracting, from each of the plurality of threat reports, a subset of the various types of cyberthreat intelligence based on regular expressions and storing the subset in the corresponding data entry, wherein building the graph is also based on the regular expressions based extracting.

3. The method of claim 1 further comprising validating instances of the various types of cyberthreat intelligence extracted from the threat report by the first language model.

4. The method of claim 1, wherein the various types of cyberthreat intelligence comprise strategic threat intelligence and tactical threat intelligence.

5. The method of claim 4, wherein prompting the first language model to extract various types of cyberthreat intelligence from each threat report comprises prompting the first language model to extract indicators of compromise, threat actors, campaign names, and tactics, techniques and procedures (TTP).

6. The method of claim 1, wherein updating information about cyberthreat campaigns based on the clustering comprises:

selecting at least a first cluster of combined embeddings;

determining a first cyberthreat campaign corresponding to the first cluster;

synthesizing threat report summaries corresponding to the combined embeddings in the first cluster to obtain a synthesized report for the first cyberthreat campaign; and updating information about the first cyberthreat campaign to indicate the synthesized report.

7. The method of claim 1, wherein updating information about cyberthreat campaigns based on the clustering comprises:

correlating a first cyberthreat campaign with a first cluster of the combined embeddings;

identifying a first set of indicators of compromise corresponding to the combined embeddings of the first cluster; and updating information about the first cyberthreat campaign with those of the first set of indicators of compromise not already indicated for the first cyberthreat campaign.

8. The method of claim 1 further comprising:

prompting a first language model to summarize a new threat report;

prompting the first language model to extract various types of cyberthreat intelligence from the new threat report;

storing a data entry that associates the new threat report, the new threat report summary, and the cyberthreat intelligence extracted from the new threat report;

updating the graph based on the new threat report, instances of the various types of cyberthreat intelligence extracted from the new threat report, and relationships among the new threat report and the instance of the various types of cyberthreat intelligence extracted from the new threat report;

obtaining a new semantic embedding of the summary of the new threat report and a new graph embedding based on the updated graph and combining the new semantic embedding and new graph embedding of the new threat report;

determining membership of the combined embedding of the new threat report with respect to the clusters generated from the clustering; and updating information about a first cyberthreat campaign already represented in the clusters based on the new threat report data entry or identifying a new campaign based on the determined membership.

9. The method of claim 1 wherein building the graph comprises, for each data entry, adding a node representing the threat report and a node for each instance of the various types of extracted cyberthreat intelligence if not already represented in the graph and relating the threat report node to the nodes representing the instances of the various types of extracted cyberthreat intelligence indicated in the data entry.

10. An apparatus comprising:

a processor; and a machine-readable medium having stored thereon instructions executable by the processor to cause the apparatus to, for each of a plurality of threat reports, prompt a set of one or more language models to summarize the threat report and to extract various types of cyberthreat intelligence from the threat report including TTP (tactics, techniques and procedures);

build a graph based on the plurality of threat reports, instances of the various types of cyberthreat intelligence extracted from the plurality of threat reports, and relationships among the threat reports and the instances of the various types of extracted cyberthreat intelligence;

for each threat report, obtain a semantic embedding of the summary of the threat report and a graph embedding based on the graph and combine the semantic embedding and the graph embedding of the threat report;

cluster the combined embeddings; and update information about cyberthreat campaigns based on the clusters of combined embeddings.

11. The non-transitory, machine-readable medium of claim 10, wherein the program code further comprises instructions to extract, from each of the plurality of threat reports, a subset of the various types of cyberthreat intelligence based on regular expressions, wherein the instructions to build the graph comprise the instructions to build the graph based on the regular expressions based extracting.

12. The non-transitory, machine-readable medium of claim 10, wherein the program code further comprises instructions to validate instances of the various types of cyberthreat intelligence extracted from the threat report by the set of one or more language models.

13. The non-transitory, machine-readable medium of claim 10, wherein the instructions to prompt the set of one or more language models to extract various types of cyberthreat intelligence from each threat report comprise instructions to prompt the set of one or more language models to extract indicators of compromise, threat actors, and campaign names, as well as the TTP.

14. The non-transitory, machine-readable medium of claim 10, wherein the instructions to update information about cyberthreat campaigns based on the clusters comprise instructions to:

select at least a first cluster of combined embeddings;

determine a first cyberthreat campaign corresponding to the first cluster;

synthesize threat report summaries corresponding to the combined embeddings in the first cluster to obtain a synthesized report for the first cyberthreat campaign; and update information about the first cyberthreat campaign to indicate the synthesized report.

15. The non-transitory, machine-readable medium of claim 10, wherein the instructions to update information about cyberthreat campaigns based on the clusters comprise instructions to:

correlate a first cyberthreat campaign with a first cluster of the combined embeddings;

identify a first set of indicators of compromise corresponding to the combined embeddings of the first cluster; and update information about the first cyberthreat campaign with those of the first set of indicators of compromise not already indicated for the first cyberthreat campaign.

16. The non-transitory, machine-readable medium of claim 10, wherein the program code further comprises instructions to:

prompt the set of one or more language models to summarize a new threat report and to extract various types of cyberthreat intelligence from the new threat report;

update the graph based on the new threat report, instances of the various types of cyberthreat intelligence extracted from the new threat report, and relationships among the new threat report and the instances of the various types of cyberthreat intelligence extracted from the new threat report;

obtain a new semantic embedding of the summary of the new threat report and a new graph embedding based on the updated graph and combine the new semantic embedding and new graph embedding of the new threat report;

determine membership of the combined embedding of the new threat report with respect to the clusters; and update information about a first cyberthreat campaign already represented in the clusters based on the information extracted from the new threat report or identify a new campaign based on the determined membership.

17. A non-transitory, machine-readable medium having stored thereon program code comprising instructions to:

for each of a plurality of threat reports, prompt a set of one or more language models to summarize the threat report and to extract various types of cyberthreat intelligence from the threat report including TTP (tactics, techniques and procedures);

build a graph based on the plurality of threat reports, instances of the various types of cyberthreat intelligence extracted from the plurality of threat reports, and relationships among the threat reports and the instances of the various types of extracted cyberthreat intelligence;

for each threat report, obtain a semantic embedding of the summary of the threat report and a graph embedding based on the graph and combine the semantic embedding and the graph embedding of the threat report;

cluster the combined embeddings; and update information about cyberthreat campaigns based on the clusters of combined embeddings.

18. The apparatus of claim 17, wherein the machine-readable medium further has stored thereon instructions executable by the processor to cause the apparatus to extract, from each of the plurality of threat reports, a subset of the various types of cyberthreat intelligence based on regular expressions, wherein the instructions to build the graph comprise the instructions to build the graph based on the regular expressions based extracting.

19. The apparatus of claim 17, wherein the machine-readable medium further has stored thereon instructions executable by the processor to cause the apparatus to validate instances of the various types of cyberthreat intelligence extracted from the threat report by the set of one or more language models.

20. The apparatus of claim 17, wherein the instructions to prompt the set of one or more language models to extract various types of cyberthreat intelligence from each threat report comprise instructions executable by the processor to cause the apparatus to prompt the set of one or more language models to extract indicators of compromise, threat actors, and campaign names, as well as the TTP.

* * * * *